United States Patent
Smith, III

(10) Patent No.: US 6,283,444 B1
(45) Date of Patent: Sep. 4, 2001

(54) UNDERSEA HYDRAULIC COUPLING MEMBER

(75) Inventor: Robert E. Smith, III, Missouri City, TX (US)

(73) Assignee: National Coupling Company, Inc., Stafford, TX (US)

( * ) Notice: Subject to any disclaimer, the term of this patent is extended or adjusted under 35 U.S.C. 154(b) by 0 days.

(21) Appl. No.: 09/607,541

(22) Filed: Jun. 29, 2000

(51) Int. Cl.[7] .................................................. F16L 37/28
(52) U.S. Cl. .................. 251/149.7; 137/614; 137/614.04
(58) Field of Search .............................. 251/149.7, 149.6; 137/614.04, 614

(56) References Cited

U.S. PATENT DOCUMENTS

| | | |
|---|---|---|
| 2,599,935 | 6/1952 | Pasker . |
| 2,727,759 | 12/1955 | Elliott . |
| 2,727,761 | 12/1955 | Elliott et al. . |
| 3,215,161 | 11/1965 | Goodwin et al. . |
| 4,582,347 | 4/1986 | Wilcox et al. . |
| 4,754,780 | 7/1988 | Smith, III . |
| 4,799,512 | 1/1989 | Sarson . |
| 4,813,454 | 3/1989 | Smith, III . |
| 4,832,080 | 5/1989 | Smith, III . |
| 4,924,909 | 5/1990 | Wilcox . |
| 5,063,965 | 11/1991 | Wilcox . |
| 5,072,755 | 12/1991 | Wilcox . |
| 5,099,882 * | 3/1992 | Smith, III ........................ 137/614.04 |
| 5,203,374 | 4/1993 | Smith, III . |
| 5,277,225 | 1/1994 | Smith . |
| 5,360,035 | 11/1994 | Smith . |
| 5,390,702 | 2/1995 | Smith, III . |
| 5,692,538 * | 12/1997 | Smith, III ...................... 251/149.8 X |

* cited by examiner

Primary Examiner—Kevin Lee
(74) Attorney, Agent, or Firm—Fulbright & Jaworski

(57) ABSTRACT

An undersea hydraulic coupling member is disclosed having a valve actuator extending through the probe section and the leading face, and having angled flow ports in the probe section which help keep the hydraulic system clear of debris when the coupling members are disconnected subsea.

12 Claims, 1 Drawing Sheet

UNDERSEA HYDRAULIC COUPLING MEMBER

BACKGROUND OF THE INVENTION

1. Field of the Invention

This invention relates in general to hydraulic couplings, and specifically to hydraulic couplings used in undersea drilling and production applications. More particularly, this invention involves a hydraulic coupling member with a reduced probe diameter and flow ports in the probe configured to prevent ingress of debris into the hydraulic system.

2. Description of Related Art

Subsea hydraulic couplings are old in the art. The couplings generally consist of a male member and a female member with sealed fluid passageways connecting therebetween. The female member generally is a cylindrical body with a relatively large diameter longitudinal bore at one end and a relatively small diameter longitudinal bore at the other. The small bore facilitates connections to hydraulic lines, while the large bore seals and slidingly engages the male member of the coupling. The male member includes a cylindrical portion at one end having an outer diameter approximately equal to the diameter of the large bore in the female member of the coupling. The male member also includes a connection at its other end to facilitate connection to hydraulic lines. When the cylindrical portion of the male member is inserted into the large bore of the female member, according to various embodiments of the device, fluid flow is established between the male and female members. Several couplings of this type are shown in patents owned by National Coupling Company, Inc. of Stafford, Tex.

In undersea drilling and production applications, the male member of the coupling may be connected to a manifold plate or other securement at a subsea location at the inside or outside of a well bore. In many cases, the male members are positioned so that the end or leading face of each member points vertically up from the sea floor. The female members, which also may be secured to a manifold plate, are moved into position over the male members and then lowered onto the male members by a diver or subsea vehicle, such as an ROV (remote operating vehicle). When the female members are positioned on the male members, hydraulic fluid flow typically is from the female member to the male member of each coupling. Typically, one or both of the coupling members have poppet valves.

Each poppet valve typically includes a conical valve face which seats, in the closed position, against a valve seat in the coupling member. The poppet valve opens to allow fluid flow, and closes against the valve seat within the bore to arrest the flow. Generally, the poppet valve is spring-biased to the closed position. The valve may include a valve actuator which may be a nose or stem extending from the apex of the valve face along the longitudinal axis of the poppet valve.

Frequently, well bores in which the couplings are positioned contain debris. The male member, which remains subsea when the coupling is disconnected, is subject to debris accumulating in exposed flow passages when it is disconnected from the female member. The debris may contaminate the hydraulic fluid or cause wear to the seals and sealing surfaces in the hydraulic couplings and hydraulic system.

Exposed flow passages in the male coupling member may be adjacent the end or leading face of the probe section, male coupling member. Additionally, when the poppet valve is positioned intermediate the male member, debris could accumulate in that portion of the male member between the leading face and the poppet valve, sometimes referred to as the probe section. For example, in couplings having the poppet valve in the body section, there is a risk of accumulating debris in the probe section when the poppet valve is closed. A coupling member is needed to prevent the debris from accumulating in the probe section, to prevent such debris from entering the hydraulic lines, and to prevent interference with the valve actuator which extends from the poppet valve.

In U.S. Pat. No. 5,692,538 to Robert E. Smith III, assigned to National Coupling Company, Inc., an undersea hydraulic coupling member is shown having angled flow passages in the body of the male member to help prevent ingress of debris. When the female member is attached to the male member, hydraulic pressure through the angled flow ports and against the face of the poppet valve urges the poppet valve of the male member open to allow fluid to flow between the coupling members. The poppet valve in combination with the angled flow ports in the male member body help prevent ingress of debris, while allowing trapped hydraulic fluid pressure to bleed off when the coupling members are disconnected.

Recently there is a need for undersea hydraulic couplings in extremely deep water systems. It is desirable to reduce the size and weight of each coupling member for such systems. For example, it is desirable to reduce the diameter of the probe section of the male member, thus reducing the size and weight of the coupling member. However, the need remains to maintain high flow rates of hydraulic fluid through the coupling members and hydraulic system of which the coupling is a part. An undersea hydraulic coupling also is needed that will help prevent debris and other particles from entering the hydraulic lines.

SUMMARY OF THE INVENTION

The present invention resides in an undersea hydraulic coupling member having a poppet valve in the body section of the coupling, a valve actuator extending from the poppet valve through a reduced diameter probe section, and a plurality of angled flow ports in the probe section to prevent debris, including sand, drilling mud, particles, rust, etc., from entering the coupling and hydraulic system. A valve actuator extends through the probe section and out from the leading face of the male member, and may be urged axially to open the male member poppet valve. Hydraulic fluid then may flow through the angled flow ports, around the annulus between the valve actuator and the bore in the male member, and past the poppet valve of the male member.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

The FIGURE is a section view of a male member of the coupling according to a preferred embodiment of the present invention.

DETAILED DESCRIPTION OF A PREFERRED EMBODIMENT

Figure 1:
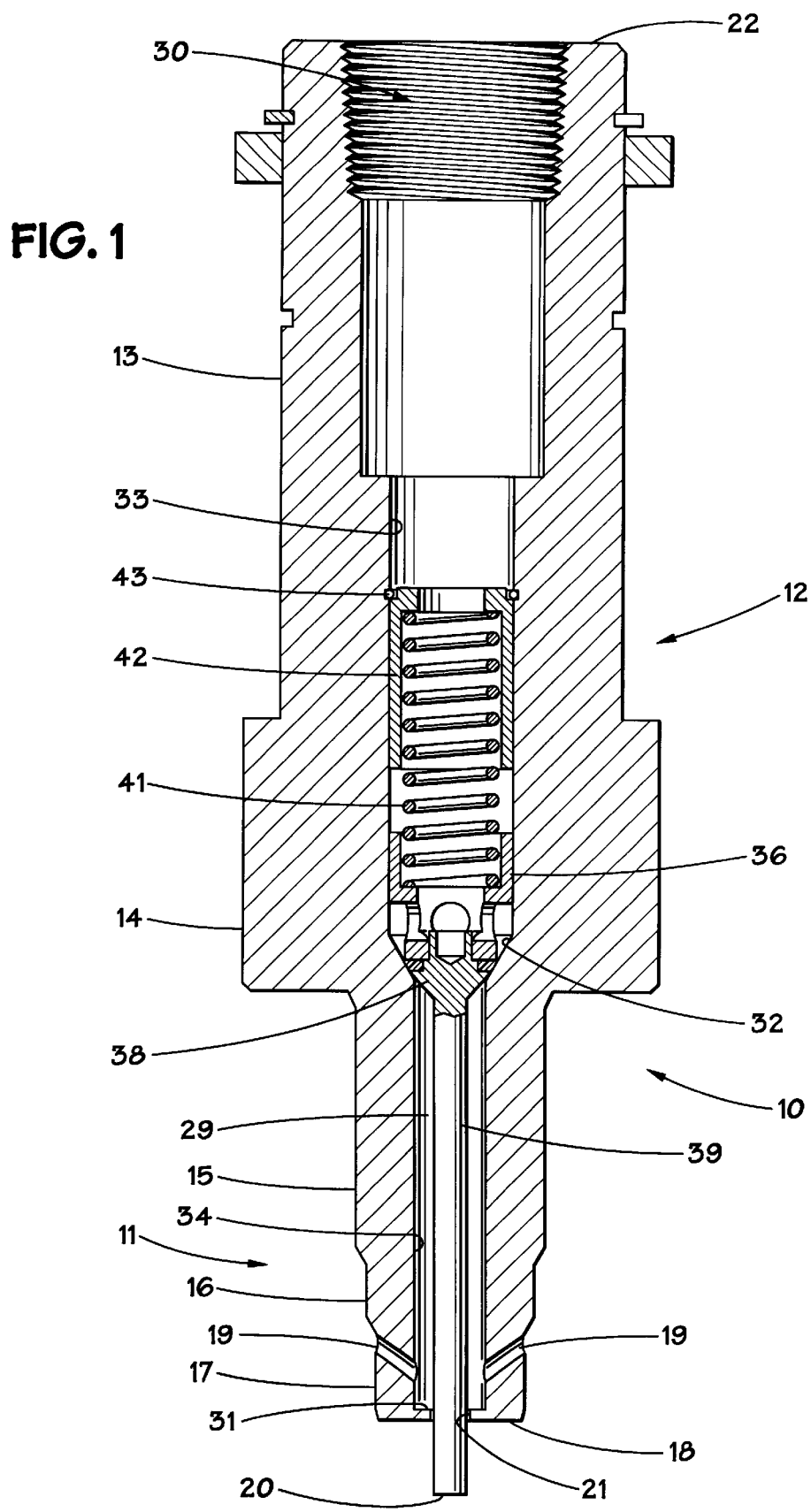

The coupling of the present invention includes male member 10 having probe section 11 and body section 12.

The male member typically faces upwardly from the subsea floor so that the leading face or first end 18 faces upwardly and the second end 22 faces downwardly. The second end of the male member is commonly attached to a manifold plate using various means, such as set screws or threads. Techniques for attaching hydraulic coupling members to such manifold plates are well known to those skilled in the art.

The body section 12 of the male member includes cylindrical section 13 and flange 14. Flange 14 terminates at probe section 11. The probe section, in a preferred embodiment has a stepped cylindrical outer diameter, with first section 15, second section 16, and third section 17 terminating at leading face 18. When the probe section of the male member is inserted into the female member bore, first section 15 preferably has a sliding interfit with the female member. Third section 17 of the male member is sufficiently smaller in diameter than the internal diameter of the female member bore, to allow the flow of hydraulic fluid through the annulus between third section 17 of the male member and the female member bore. Hydraulic fluid flowing through annulus 17 enters the male member through angled flow ports 19, as will be described in more detail below.

The male member has a central bore 30 extending longitudinally therethrough. A poppet valve is positioned in the body section 12 of the male member. The poppet valve has a conical valve face 38 which seals against valve seat 32 when the valve is in the closed position. The poppet valve also has a cylindrical valve body 36 which has a sliding interfit with cylindrical passage 33 in the male member body. Helical valve spring 41 is used to urge valve face 38 into a closed position against valve seat 32. The helical valve spring is located within cylindrical passage 32 and is anchored by hollow spring collar 42 which is held in place by collar clip 43.

Extending from valve face 38 is valve actuator 39 which is a cylindrical stem extending along the longitudinal axis of the probe section of the male member. The valve stem extends through aperture 21 in leading face 18 of the male member. When tip 20 of the valve actuator is urged longitudinally, the valve actuator moves the poppet valve open to allow hydraulic fluid to flow through the annulus surrounding the third section 17 of the probe, through angled flow ports 19 and through annulus 29 between the valve actuator and bore 34 extending through the probe section. Hydraulic fluid then will flow past poppet valve 38 and out central bore 30 at the second end 22 of the male member.

In a preferred embodiment, the diameter of valve actuator 39 is not greater than one-half the internal diameter of cylindrical passage 34, and preferably less than one-half of the internal diameter of cylindrical passage 34. This allows for adequate flow of hydraulic fluid through annulus 29 between the valve actuator and the cylindrical passage in the male member.

By positioning the poppet valve in the body section of the male member, rather than in the probe section of the male member, the external dimensions of the male member may be reduced substantially without reducing the flow rate, or volume of hydraulic fluid, that passes through the coupling. Specifically, the outer diameter of the probe section 11 is reduced without reducing the wall thickness of the probe section, or reducing the flow of hydraulic fluid through cylindrical passage 34 in the probe section.

The valve actuator, which is configured to abut an opposing valve actuator extending from the female member poppet valve, reliably opens the poppet valve in the male member when axial or longitudinal forces are applied to the tip 20 of the valve actuator. The aperture 21 in leading face 18 of the male member is dimensioned to allow a sliding interfit of the valve actuator therethrough. Hydraulic fluid enters the male member through two or more angled flow ports 19. The flow ports are angled such that debris, particles, sand, drilling mud, rust, etc. cannot enter the hydraulic system through the male member when the male member is positioned subsea. Typically, even at ocean depths of several thousand feet or more, such debris is subject to gravitational forces which tend to allow such debris to accumulate in exposed passages. The angled flow ports are configured so that the outer facing end of each angled flow port is positioned downwardly, or further from the leading face 18 of the male member, than the inner end of each angled flow port. Accordingly, the angled flow ports significantly reduce or eliminate the risk of accumulated debris in the hydraulic system through the male member.

With the poppet valve positioned in the body section, rather than the probe section, of the male member, the dimensions and weight of each coupling member may be reduced substantially. This provides advantages in handling of coupling members at significant ocean depths. However, the valve actuator extending through the probe section should allow the hydraulic fluid flow rate and volume to be maintained at desired levels. Not only must the angled flow ports be of sufficient diameter to allow desired rates of hydraulic fluid to flow therethrough, but the annulus 29 through the probe section of the male member should be sufficiently large to allow hydraulic fluid to flow at desired rates through the male member of the coupling. The desired flow rates through the probe section of the male coupling member are achieved by positioning the poppet valve in the body section of the male member, with the actuator extending through the probe section and out the leading face 18 of the probe section.

Although variations in the embodiment of the present invention may not each realize all of the advantages of the invention, certain features may become more important than others in various applications of the device. The invention, accordingly, should be understood to be limited only by the scope of the appended claims.

What is claimed is:

1. An undersea hydraulic coupling member comprising:

(a) a body section and a probe section, a longitudinal bore extending through both sections, the probe section having a outer surface with a stepped outer diameter and a leading face, the leading face having an aperture therein;

(b) a poppet valve in the longitudinal bore in the body section for controlling flow of hydraulic fluid through the bore, the poppet valve slideable between an open position and a closed position, the poppet valve being biased to the closed position;

(c) at least one fluid passage in the probe section having a first end in the bore and a second end through the cylindrical outer surface of the probe section, the fluid passage sloping down from the first end to the second end when the body is positioned with the leading face of the probe section facing up; and (d) a valve actuator in the longitudinal bore in the probe section, the value actuator attached to the poppet valve and extending longitudinally through the aperture in the leading face of the bore, the actuator being moveable upon application of longitudinal force thereto to urge the poppet valve to the open position for flow of hydraulic fluid through the fluid passage and the bore.

2. The undersea hydraulic coupling of claim 1 wherein the cylindrical outer surface of the probe section has a larger diameter and a smaller diameter, the second end of the fluid passage extending through the smaller diameter.

3. The undersea hydraulic coupling of claim 1 wherein the longitudinal bore is stepped, the diameter of the bore in the body section is larger than the diameter of the bore in the probe section.

4. The undersea hydraulic coupling of claim 3 wherein the valve actuator is cylindrical and has a diameter less than one-half of the diameter of the bore in the probe section.

5. A male undersea hydraulic coupling member for engagement with a female undersea hydraulic coupling member, comprising:

(a) a female coupling member and a male coupling member including a cylindrical probe having a first section with an outer diameter dimensioned to have a sliding interfit with the female undersea hydraulic coupling member, a second section having an outer diameter smaller than the first section to provide an annulus between the second section and the female undersea hydraulic coupling member sufficient for passage of hydraulic fluid therethrough when the male undersea hydraulic coupling member is engaged to the female undersea hydraulic coupling member, the second section terminating at a leading face, the second section having angled flow ports therethrough, each angled flow port having an inwardly facing end and an outwardly facing end, the outwardly facing end extending through the outer diameter of the second section at a location spaced further from the leading face; the male member having a third section having an outer diameter larger than the first section; only the first and second sections of the probe dimensioned to fit in the female member; and (b) a valve in the third section for controlling hydraulic fluid flow through the male undersea hydraulic coupling member, the valve having an actuator extending longitudinally through the first and second sections of the cylindrical probe and out from the leading face, the actuator being compressible to open the valve and allow fluid flow from the male undersea hydraulic coupling member, through the angled flow ports and the annulus, to the female undersea hydraulic coupling member.

6. The male undersea hydraulic coupling member of claim 5 further comprising a stepped internal bore through the cylindrical probe.

7. The male undersea hydraulic coupling member of claim 6 further comprising a valve seat intermediate the stepped internal bore.

8. The male undersea hydraulic coupling member of claim 7 further comprising a spring urging the valve against the valve seat.

9. The male undersea hydraulic coupling member of claim 6 further comprising a second annulus between the actuator and the stepped internal bore.

10. An undersea hydraulic coupling member comprising:

(a) a cylindrical body with a first end and a second end, a stepped outer diameter with a plurality of progressively larger diameters from the first end to the second end, a central bore through the body, and a valve in the central bore in the largest diameter of the body for controlling fluid flow therethrough, the valve having an actuator extending therefrom and through the smallest diameter of the body and out the first end of the cylindrical body, the actuator having a diameter smaller than the diameter of the central bore to form an annulus therebetween; and (b) a plurality of angled flow ports through the cylindrical body adjacent the first end thereof, the actuator moveable toward the first end of the cylindrical body to open the valve and allow hydraulic fluid to flow through the angled flow ports, the annulus, the central bore, and the second end of the body.

11. The undersea hydraulic coupling member of claim 10 wherein each of the angled flow ports have an inner end and an outer end, the inner end spaced closer to the first end of the cylindrical body.

12. The undersea hydraulic coupling member of claim 10 wherein the valve is biased to close.

* * * * *